Feb. 25, 1964   V. SHANOK ETAL   3,122,043
ROTARY SAW WITH ROTARY WORK CONVEYOR
Filed Jan. 19, 1960   2 Sheets-Sheet 1
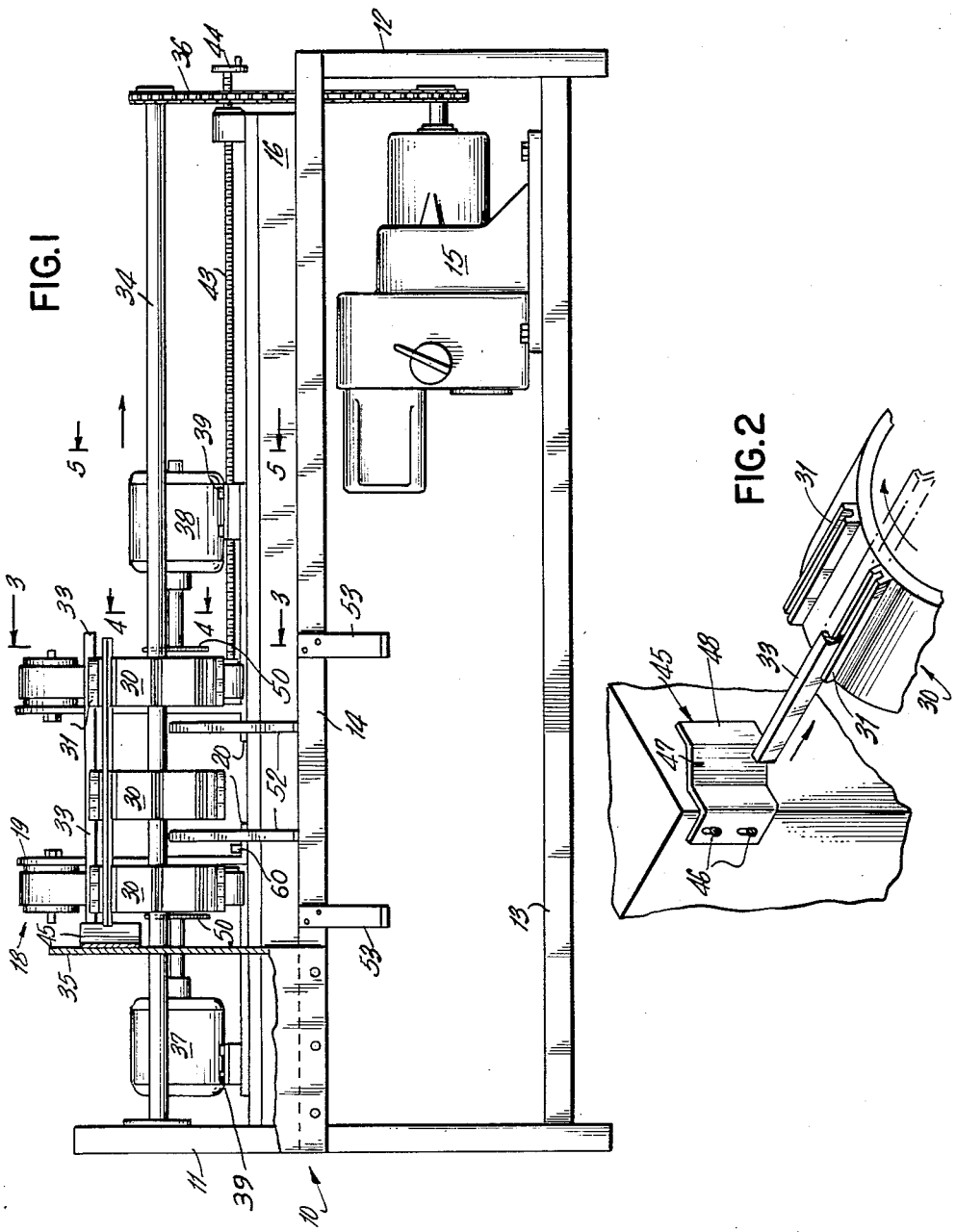
INVENTOR.
VICTOR SHANOK
JESSE P. SHANOK
BY
ATTORNEY Feb. 25, 1964    V. SHANOK ETAL    3,122,043
ROTARY SAW WITH ROTARY WORK CONVEYOR
Filed Jan. 19, 1960    2 Sheets-Sheet 2
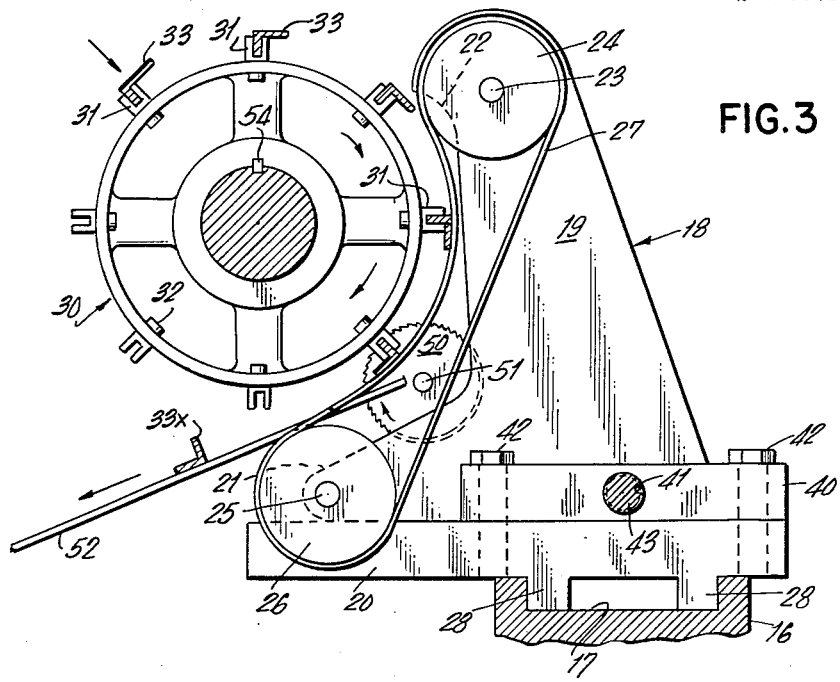
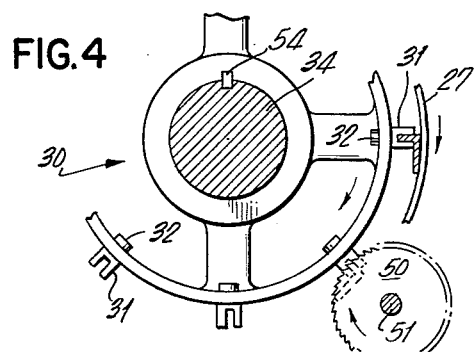
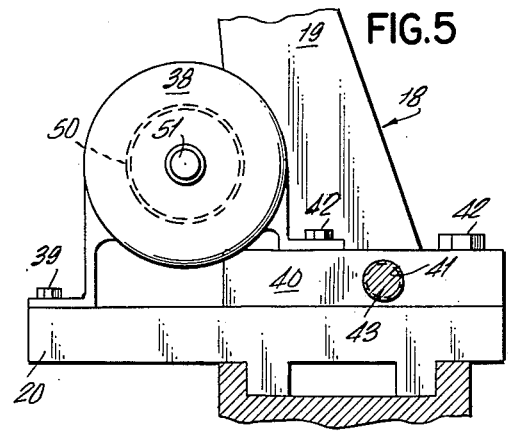
INVENTORS
VICTOR SHANOK
BY JESSE P. SHANOK
ATTORNEY

United States Patent Office 3,122,043
Patented Feb. 25, 1964

3,122,043
ROTARY SAW WITH ROTARY WORK CONVEYOR
Victor Shanok and Jesse P. Shanok, both of
863 65th St., Brooklyn, N.Y.
Filed Jan. 19, 1960, Ser. No. 3,305
1 Claim. (Cl. 83—411)

This invention relates to a mechanism for cutting longitudinal elements to a precise length.

It is an object of this invention to provide a machine for cutting longitudinal strips into strips of precise length.

It is another object to provide a cutting mechanism adapted to receive the strips or elements to be cut in spaced-apart relationship upon a plurality of continuously moving feed wheels.

It is a further object to provide continuous automatic belt means for holding the elements to be cut firmly while said elements are being cut.

These and other objects of this invention will become apparent upon reading the following descriptive disclosure taken in conjunction with the accompanying drawing in which:

FIGURE 1 is a front elevation view of the mechanism showing a pair of motors for separate operation of a pair of separate spaced apart circular saws;

FIGURE 2 is a detail view of means for automatic positioning of the strips to be cut to precise lengths;

FIGURE 3 is a section view taken on line 3—3 of FIGURE 1 and showing the relationship of the feed wheels and the strips to be cut thereon to belt holding means and also to one of the circular saws used to cut said strips and showing also the manner of sliding the holding mechanism in a support frame;

FIGURE 4 is a detail view, broken away in part, and taken on line 4—4 of FIGURE 1, showing a feed wheel, and a plurality of strip holders thereon and their relationship to a cutting saw; and FIGURE 5 is a view taken on line 5—5 of FIGURE 1, showing the manner of sliding the electric motor with its cutting wheel in the support frame.

The device of this invention is used to cut longitudinal strips or elements of whatsoever configuration or shape into precise lengths. The elements to be cut may be plastic extruded material or they may be metallic strips, tubing, rods, extrusions, etc.

Frequently, there is a need for a plurality of longitudinal pieces all of the same precise length. Prior art devices were not capable of accomplishing rapid production along with precise length. The instant device is capable of producing these dual desired results.

Turning to the drawing, a support stand 10 consisting of a pair of spaced-apart upright supports 11 and 12, and a lower horizontal support 13 and an upper horizontal support 14, is provided with an electrical drive motor 15 bolted to the lower horizontal support 13. A longitudinal guide bar 16 is provided with a suitable slideway channel 17, said guide bar 16 being secured to the top horizontal support 14 by conventional means, for example, bolts (not shown).

A plurality of idler wheel supports 18, preferably two, are each provided with an upright element or stanchion 19, preferably integral with a right angle base plate 20. The stanchion 19 is provided with a toe portion 21 having a suitable aperture therein. As shown in FIGURE 3, the stanchion 19 is preferably provided with a curved undercut rim 22 to permit suitable passage of the plastic strips being cut. The stanchion 19 is thereby given the configuration of substantially an L-shaped element. A suitable aperture is provided in the apex of the upright stanchion 19 and an idler axle 23 is disposed therein. A suitably wide drum wheeel 24 is disposed on axle 23. Similarly, an idler axle 25 is disposed in the aperture in the toe portion 21 of stanchion 19 and a drum wheel 26 is disposed thereon.

A suitably loose belt 27 is looped around the suitably spaced apart drum wheels 24 and 26 for a purpose to be described hereinafter.

The base plate 20 of each idler wheels support 18 is provided with a pair of integral depending spaced-apart legs 28. The legs 28 each respectively engage the respective vertical walls of channel 17, as well as the bottom wall of said channel 17 in a snug manner. The right hand idler wheel support 18 (viewing FIG. 1) is slidably movable in slideway channel 17 of the guide bar 16, but the left hand idler wheel support is fixed to the guide bar, as by bolt 60 which fixes the base plate 20 thereof to the guide bar.

A feature of this invention is the provision of strip holding means comprising a plurality of broad rimmed wheels 30, each having a plurality of strip holders 31 secured by bolts 32 to the flat periphery of the wheels 30 in suitable spaced-apart relationship. As shown in FIGURE 3, the strip holders 31 may be U-shaped bars adapted to hold a plastic strip 33. Preferably, three wheels 30 are disposed upon a shaft 34 with the respective plastic holders 31 of the wheels being in longitudinal register thereby permitting a long plastic strip 33 to be inserted simultaneously into the respective linearly disposed holders 31 on said wheels 30.

The shaft 34 is journaled in the vertical end support 11 of frame 10 and into the vertical plate of a motor cover mantle 35. Additional supporting means may be used for supporting shaft 34 if desired. The shaft 34 is provided with a sprocket wheel at its free end and a chain drive 36 is connected to the shaft sprocket wheel and a co-acting sprocket wheel secured to the drive shaft of motor 15. Preferably, about eight holders 31 are provided on each wheel 30 spaced equally from one another (FIGURE 3). However, the number of holders 31 on the respective wheels 30 may be varied as desired. Also, the holders 31 may be of varied configuration other than the U-shaped configuration shown in the embodiment of the drawing.

Electric motors 37 and 38 are each disposed on a respective base plate 20 of each idler wheel support 18 and secured thereto as by bolts 39 (FIGURE 5). A secondary base plate 40 of suitable dimensions is provided with a suitable screw-threaded aperture 41 and secured to a suitable base plate 20 by a plurality of bolts 42. A longitudinal threaded rod 43 is disposed through the respective threaded aperture in both of the secondary base plates disposed respectively on motor 38 and in the adjacent idler wheel support 18. In this manner, motor 38 along with its adjacent support 18 is moved as a unit selectively to left or right (FIGURE 1) by selective rotation of threaded rod 43 by hand crank 44.

Where the base plate 20 is cut transversely to provide a first plate portion for motor 38 and a second plate portion for the adjacent idler wheel support 18, the motor 38 may in this instance be moved separately from its adjacent support 18 when the threaded rod 43 is disposed only in the secondary base plate 40 associated with said motor 38.

To facilitate rapid automatic alignment of one end of each of the plastic strips 33, as these strips rotate toward a pair of cutting wheels, a suitable beveled striker plate 45 is provided. The striker plate 45 is secured to the mantle 35 by a pair of metal screws 46 and positioned so that the plastic strips strike the bevel section 47 as the wheel 30 rotates. Upon further rotation of wheel 30 the strips 33 are frictionally pushed down the incline of the bevel section 47 and through the respective holders 31 until they pass the apron section 48 of said striker plate 45.

To effect rapid precision cutting of the plastic lengths 33, a circular saw blade 50 is disposed on each motor axle 51 of motors 37 and 38 in opposed relationship. Each saw blade is caused to rotate in a manner directly opposite to its normal rotation for cutting purposes. Also, as shown in FIGURE 3, the rotation of the wheels 30 is clockwise whereas the rotation of the cutting blades 50 is counterclockwise. Thus, the plastic strips are fed into counter rotating saw blades. The pair of saw blades 50 are disposed in opposed linear relationship to effect simultaneous cutting of the individual strips 33.

After being cut, the strips 33 fall by gravity from their holder 31 upon a pair of suitably spaced-apart inclined guide bars 52.

A pair of spaced-apart L-shaped holder brackets 53 for storing uncut strips 33 to be fed into the wheels 30 are also provided to facilitate rapid feeding of the mechanism.

In operating the cutting mechanism of this invention, the strips 33 of random lengths are removed and manually fed into the holders 31 of the wheels 30 in advance of the striker plate 45. After alignment by the striker plate 45, the strips 33 are aligned at one end but not at the other. These strips are then rotated into the plurality of belts 27 loosely disposed around each respective pair of drum wheels 24 and 26 of the respective supports 18. The continuous belts 27 are pre-selected so as to produce a tautness or belt tension which firmly engages each plastic strip 33 frictionally just prior to its being cut. Thus, the plastic strip 33 upon being cut at its opposed ends is rigidly held against all movement in the coactive plastic holders 31 by the belts 27, thereby preventing the strips 33 from being displaced downwardly by gravity or longitudinally in the holders due to the vibration caused by the cutting blades.

In this mechanism, the left motor 37 (FIGURE 1) is bolted in place and therefore fixed at all times. More specifically, while motor 37 is bolted by bolts 39 to the base plate 20 of the associated stanchion 19 of the associated support means 18 as previously indicated, said base plate 20 is bolted, as at 60, to the guide 16 to retain motor 37 in fixed condition. On the other hand, the right motor 38 is selectively movable longitudinally to obtain the precise length of plastic strip desired. Preferably, both the motor 38 and its adjacent idler wheels support is moved as a unit so that the optimum distance between the holders 31 thereon and the saw blade 50 of motor 38 is maintained. Manifestly, if the blade 50 cuts at a relatively great distance from the holder 31 holding a strip 33, the strip 33 will bend while being cut and produce an undesirable product.

The wheels 30 are keyed to shaft 34 by keys 54 so that they may be moved toward or away from one another. Thus, this cutting mechanism has versatility in that it can precisely cut small lengths of plastic strips as well as long lengths. Optionally, a safety switch of motor 15 may be provided for the operator who manually feeds the strips into the mechanism.

Other modifications will now become readily apparent to those skilled in the art after reading this disclosure but all these modifications are deemed to fall within the scope of the claim herein.

We claim:

A cutting mechanism for rapidly cutting a plurality of longitudinal strips into precise lengths comprising a longitudinal base having a guideway channel therein, a pair of spaced-apart upright elements, one of said upright elements being firmly and slidingly engaged in said guideway, another of said upright elements being fixedly secured to said longitudinal base, a pair of suitably spaced-apart idler wheels secured to each of said upright elements, a continuous belt of substantially loose fit disposed about each pair of idler wheels of each upright element, a plurality of holder wheels keyed to a common shaft and disposed in suitable spaced relationship to said belts, strip holder means secured to the periphery of each of said holder wheels and disposed in linear relationship thereon for holding a strip to be cut and for feeding rotationally said strip into suitable frictional contact with the outer surfaces of said belts in a belt taut manner for driving said belts at the same linear speed as the strip, and a pair of linearly disposed spaced-apart saws adapted for simultaneously cutting said firmly held strip against all movement, each strip holder means being adapted for releasing its cut strip portion from the periphery of the associated holder wheel upon the cutting of the associated strip, a motor for each of said saws, each saw being journaled to the axle of its associated motor, one of said motors being mounted for slidable movement along said guideway, the other of said motors being fixedly secured to said longitudinal base, and means for effecting mutual adjustment of said upright elements, said means comprising a base provided on said one upright element, said element base having a screw-threaded aperture longitudinally disposed therein, a base plate secured to said one motor and having a screw-threaded aperture therein in linear alignment with the screw-threaded aperture in the base of said one upright element, and a threaded rod adapted for selective rotation disposed in the screw-threaded apertures of said one motor base plate and said one upright element base, whereby rotation selectively of said rod moves said one upright element and said one motor as a unit relative to said other upright element thereby obtaining precision cut strips of predetermined lengths.

References Cited in the file of this patent

UNITED STATES PATENTS

| | | |
|---|---|---|
| 1,058,714 | Binns | Apr. 15, 1913 |
| 2,020,491 | Winters | Nov. 12, 1935 |
| 2,047,021 | Friden | July 7, 1936 |
| 2,321,735 | Clifford | June 15, 1943 |
| 2,390,907 | Winter | Dec. 11, 1945 |
| 2,591,394 | Barth | Apr. 1, 1952 |
| 2,706,000 | Landis | Apr. 12, 1955 |
| 2,929,289 | Gorecki | Mar. 22, 1960 |